United States Patent [19]

Yoshida et al.

[11] Patent Number: 5,668,205
[45] Date of Patent: Sep. 16, 1997

[54] SILICONE RUBBER COMPOSITIONS FOR HIGH-VOLTAGE ELECTRICAL INSULATORS

[75] Inventors: Takeo Yoshida; Azechi Shuuichi, both of Gunma-ken, Japan

[73] Assignee: Shin-Etsu Chemical Co., Ltd., Tokyo, Japan

[21] Appl. No.: 675,522

[22] Filed: Jul. 3, 1996

Related U.S. Application Data

[63] Continuation of Ser. No. 451,155, May 26, 1995, abandoned.

[30] Foreign Application Priority Data

May 27, 1994  [JP]  Japan .................................. 6-138184
May 27, 1994  [JP]  Japan .................................. 6-138185

[51] Int. Cl.$^6$ ................................................ C08K 9/06
[52] U.S. Cl. .................. 524/268; 524/588; 524/786; 524/860; 524/861; 525/477; 525/478
[58] Field of Search ........................... 524/588, 268, 524/786, 860, 862; 525/477, 478

[56] References Cited

U.S. PATENT DOCUMENTS

| | | | |
|---|---|---|---|
| 3,965,065 | 6/1976 | Elliott | 524/430 |
| 4,011,168 | 3/1977 | Uhlmann | 252/63.7 |
| 4,418,171 | 11/1983 | Hall | 524/268 |
| 4,749,824 | 6/1988 | Orbeck | 174/179 |
| 4,755,554 | 7/1988 | Itoh et al. | 524/588 |
| 5,369,161 | 11/1994 | Kunieda et al. | 524/266 |
| 5,378,742 | 1/1995 | Matsushita et al. | 523/213 |
| 5,519,080 | 5/1996 | Matsushita et al. | 524/437 |

OTHER PUBLICATIONS

Hawley's Condensed Chemical Dictionary, Twelfth Ed. p. 42 1993.

*Primary Examiner*—Margaret W. Glass
*Attorney, Agent, or Firm*—Millen, White, Zelano, & Branigan, P.C.

[57] ABSTRACT

A silicone rubber composition of the addition curing type containing an organopolysiloxane having at least two aliphatic unsaturated hydrocarbon groups in a molecule, silica, an organohydrogenpolysiloxane, a platinum catalyst, and a liquid organopolysiloxane blocked with a $(CH_3)_3SiO_{1/2}$ unit at either end, having a monovalent hydrocarbon group (exclusive of an aliphatic unsaturated hydrocarbon group) attached to a silicon atom, provides a composition heat curable to a silicone rubber having improved weathering and tracking resistance and thus useful for high-voltage electrical insulators. Also, a silicone rubber composition containing an organopolysiloxane, an inorganic filler and an organic peroxide is improved by using as the organopolysiloxane one or more organopolysiloxanes of the formula: $R^6_y SiO_{(4-y)/2}$, and blending therein aluminum hydroxide. There is obtained a composition which is ready for injection molding and cures into a silicone rubber having improved weathering and tracking resistance and thus suitable for high-voltage electrical insulators.

19 Claims, No Drawings

SILICONE RUBBER COMPOSITIONS FOR HIGH-VOLTAGE ELECTRICAL INSULATORS

This application is a continuation of application Ser. No. 08/451,155, filed May 26, 1995, now abandoned.

BACKGROUND OF THE INVENTION

1. Field of the Invention

This invention relates to a silicone rubber composition which on heat curing provides silicone rubber serving as an improved high-voltage electrical insulator.

2. Prior Art

In general, high-voltage electrical insulating materials for use as insulators for power transmission lines are of porcelain or glass. In an environment subject to pollution as in seaside areas and industrial areas, there is a tendency that dust, salts and mist attach to the surface of high-voltage electrical insulators, causing leakages of current and dry band discharge leading to flashover.

In order to eliminate the drawbacks of porcelain and glass insulators, a number of proposals have been made. For example, U.S. Pat. No. 3,511,698 discloses a weather resistant high-voltage electrical insulator comprising a member of a curable resin and a platinum catalyst-containing organopolysiloxane elastomer. JP-A 198604/1984 corresponding to U.S. Pat. No. 4,476,155 proposes a one-part room temperature curable organopolysiloxane composition which is applied to the outer surface of an electrical insulator of glass or porcelain so that the electrical insulator may maintain its high electrical properties even in the presence of outdoor stresses such as moisture, air pollution and ultraviolet radiation.

JP-B 35982/1978 corresponding to U.S. Pat. No. 3,965,065 and JP-A 209655/1992 corresponding to U.S. Pat. No. 5,369,161 disclose that a silicone rubber composition with improved electrical insulation is obtained by heating a mixture of an organopolysiloxane capable of heat curing into silicone rubber and aluminum hydrate at temperatures above 100° C. for more than 30 minutes.

However, some silicone rubber materials used in the prior art techniques mentioned above are not yet fully satisfactory in high-voltage electrical insulation. Some other silicone rubber materials require an undesirably long time for curing. Also it is believed in the prior art that if platinum catalysts are used in curing silicone rubber materials, the resulting silicone rubbers are deteriorated in electrical insulation. For avoiding such adverse impact, it has been often attempted to use organic peroxides instead of the addition curing type using platinum catalysts. However, since compositions of the organic peroxide crosslinking type are based on a high-viscosity raw rubber like organopolysiloxane, a sheeting or preforming step of milling the composition by roll mills is necessary in order that the composition be ready for supply to molding machines. This sheeting or preforming step requires more amounts of labor than the injection molding step and thus forms a bar toward labor saving.

SUMMARY OF THE INVENTION

Therefore, an object of the present invention is to provide a novel and improved silicone rubber composition of the addition curing type which heat cures in the presence of a platinum catalyst into a silicone rubber which has improved high-voltage electrical properties including weathering resistance, tracking resistance, arc resistance, and erosion resistance in an application where the silicone rubber is exposed to serious air pollution and rigorous weather.

Another object of the present invention is to provide a novel and improved silicone rubber composition of the peroxide curing type which is injection moldable and cures in the presence of an organic peroxide into a silicone rubber which has improved high-voltage electrical properties including weathering resistance, tracking resistance, arc resistance, and erosion resistance in an application where the silicone rubber is exposed to serious air pollution, salt damage and rigorous weather.

We have found that by blending an appropriate amount of a liquid organopolysiloxane blocked with a $(CH_3)_3SiO_{1/2}$ unit at either end, having a monovalent hydrocarbon group (exclusive of an aliphatic unsaturated hydrocarbon group) attached to a silicon atom, and having a viscosity of about 30 to about 100,000 centipoise at 25° C. in a silicone rubber composition of the addition curing type comprising an organopolysiloxane having at least two aliphatic unsaturated hydrocarbon groups in a molecule as a main ingredient, finely divided silica, an organohydrogenpolysiloxane and a platinum catalyst, there is obtained a composition which heat cures into a silicone rubber having improved high-voltage electrical properties including weathering resistance, tracking resistance, arc resistance, and erosion resistance. The resulting silicone rubber is useful as electrical insulators, especially high-voltage electrical insulators.

Therefore, a first embodiment of the invention provides a silicone rubber composition for use as a high-voltage electrical insulator comprising (A) 100 parts by weight of an organopolysiloxane having at least two aliphatic unsaturated hydrocarbon groups in a molecule, (B) about 1 to about 100 parts by weight of finely divided silica, (C) about 50 to about 300 parts by weight of aluminum hydroxide, (D) about 1 to about 20 parts by weight of a liquid organopolysiloxane blocked with a $(CH_3)_3SiO_{1/2}$ unit at either end and having an organic group attached to a silicon atom which is a monovalent hydrocarbon group exclusive of an aliphatic unsaturated hydrocarbon group, the liquid organopolysiloxane having a viscosity of about 30 to about 100,000 centipoise at 25° C., (E) an organohydrogenpolysiloxane having at least three hydrogen atoms each attached to a silicon atom in a molecule, in a sufficient amount to provide about 0.5 to about 20 mol of the silicon atom-attached hydrogen atom per mol of the unsaturated hydrocarbon group in component (A), and (F) a catalytic amount of a platinum group catalyst.

We have also found that in a silicone rubber composition comprising an organopolysiloxane as a main ingredient, an inorganic filler and an organic peroxide, by using as the organopolysiloxane one or more organopolysiloxanes of the following average compositional formula:

$$R^6_f SiO_{(4-f)/2} \qquad (IV)$$

wherein $R^6$ is a substituted or unsubstituted monovalent hydrocarbon group and letter f is a number of 1.85 to 2.10, the organopolysiloxane being blocked with a trivinylsilyl, divinylmethylsilyl or vinyldimethylsilyl group at either end of a molecular chain thereof, an organopolysiloxane blocked with a trivinylsilyl or divinylmethylsilyl group at either end of a molecular chain occupying at least 70% by weight of the entirety, the organopolysiloxane having a viscosity of about 400 to 100,000 centipoise at 25° C., and blending an appropriate amount of aluminum hydroxide, there is obtained a composition which is ready for injection molding without cumbersome treatment and thus easy to work with and advantageous in economy. The composition cures into a silicone rubber which has improved high-voltage electrical properties including weathering resistance, tracking resistance, arc resistance, and erosion resistance in an application where the silicone rubber is exposed to serious air pollution, salt damage and rigorous weather. Thus the silicone rubber is suitable as an electrical insulator, especially a high-voltage electrical insulator.

Accordingly, a second embodiment of the present invention provides a silicone rubber composition for use as a high-voltage electrical insulator comprising (1) 100 parts by weight of at least one organopolysiloxane of formula (IV), the organopolysiloxane being blocked with a trivinylsilyl, divinylmethylsilyl or vinyldimethylsilyl group at either end of a molecular chain thereof, an organopolysiloxane blocked with a trivinylsilyl or divinylmethylsilyl group at either end of a molecular chain occupying at least 70% by weight of the entirety, the organopolysiloxane having a viscosity of about 400 to 100,000 centipoise at 25° C., (2) about 1 to about 100 parts by weight of an inorganic filler, (3) about 50 to about 300 parts by weight of aluminum hydroxide, (4) optionally, 0 to about 20 parts by weight of an organopolysiloxane of the following average composition formula:

$$R^7_g SiO_{(4-g)/2} \qquad (V)$$

wherein $R^7$ is a substituted or unsubstituted monovalent hydrocarbon group exclusive of an aliphatic unsaturated hydrocarbon group and letter g is a number of 1.85 to 2.2, preferably 1.9 to 2.1, blocked with a $(CH_3)_3SiO_{1/2}$ unit at either end of its molecular chain, and having a viscosity of about 30 to 100,000 centipoise at 25° C., and (5) about 0.1 to about 10 parts by weight of an organic peroxide.

BEST MODE FOR CARRYING OUT THE INVENTION

First embodiment

The silicone rubber composition for use as a high-voltage electrical insulator according to the first embodiment is described. The composition contains as component (A) an organopolysiloxane having at least two aliphatic unsaturated hydrocarbon groups in a molecule. It is preferably represented by the following general formula (I).

$$R^1_a R^2_b SiO_{(4-a-b)/2} \qquad (I)$$

In formula (I), $R^1$ is an aliphatic unsaturated hydrocarbon group, preferably having 2 to 8 carbon atoms, more preferably 2 to 4 carbon atoms, for example, vinyl, allyl and propenyl groups. $R^2$ is a substituted or unsubstituted monovalent hydrocarbon group free of an aliphatic unsaturated bond, preferably having 1 to 12 carbon atoms, more preferably 1 to 10 carbon atoms, for example, alkyl groups such as methyl, ethyl, propyl and butyl, cycloalkyl groups such as cyclohexyl, aryl groups such as phenyl and tolyl, aralkyl groups such as benzyl and phenylethyl, and substituted alkyl groups such as 3,3,3-trifluoropropyl and 3-chloropropyl. Letters a and b are positive numbers satisfying the requirements: $0<a\leq1$, $0.8<b<3$, and $0.8<a+b<3$, preferably $0.0005\leq a\leq0.5$, $1\leq b<2.5$, and $1.5\leq a+b\leq2.5$, especially $0.001\leq a\leq0.2$, $1.5\leq b<2.2$, and $1.8\leq a+b\leq2.2$.

The organopolysiloxane (A) may have a linear, branched, cyclic or network molecular structure. No particular limit is imposed on molecular weight and any organopolysiloxanes from liquid ones having a low viscosity to raw rubber-like ones having a high viscosity are useful. However, in order for organopolysiloxanes to cure into rubbery elastomers, they should desirably have a viscosity of at least about 100 centipoise at 25° C., more desirably about 100 to about 1,000,000 centipoise at 25° C., most desirably about 1,000 to about 100,000 centipoise at 25° C.

Some illustrative examples of organopolysiloxane (A) are diorganopolysiloxanes having a linear molecular structure as given below.

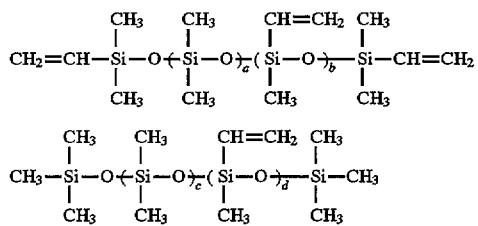

In these formulae, letters a and c are positive integers, b is a positive integer inclusive of 0, and d is a positive integer of at least 2, a+b and c+d are such numbers that these vinyl-containing organopolysiloxanes may have a viscosity within the above-defined range. The organopolysiloxanes may be used alone or in admixture of two or more. A partially branched structure is also acceptable.

Component (B) is finely divided silica which may be any of those commonly used in conventional silicone rubber compositions. Preferred are precipitated silica, fumed silica and fired silica having a specific surface area of more than about 50 m²/g, especially about 50 to 400 m²/g as measured by a BET method as well as ground quartz and diatomaceous earth having a mean particle size of less than about 50 μm, especially about 0.1 to 20 μm. These fine powders may be used as such while hydrophobic silica which has been surface treated with organic silicon compounds, for example, organosilazanes, organochlorosilanes, and organopolysiloxanes, such as hexamethyldisilazane, trimethylchlorosilane and polymethylsiloxane is also useful.

Component (B) is blended in an amount of about 1 to about 100 parts, preferably about 2 to about 50 parts by weight per 100 parts by weight of component (A). On this basis, compositions containing less than 1 part of component (B) are low in mechanical strength whereas the presence of more than 100 parts of component (B) inhibits high loading of component (C) or aluminum hydroxide.

Component (C) is aluminum hydroxide which is effective for improving the arc resistance and tracking resistance of silicone rubber. It is essential for the composition of the invention. Aluminum hydroxide is generally represented by the formula: $Al_2O_3 \cdot 3H_2O$. Preferably aluminum hydroxide is in particulate form having a mean particle size of up to about 10 μm, often about 0.1 to about 10 μm, especially about 0.5 to about 9 μm. Aluminum hydroxide may be used as such while it may have been surface treated with suitable agents such as silane and titanate coupling agents, dimethylpolysiloxane oil, and stearic acid.

Component (C) is blended in an amount of about 50 to about 300 parts, preferably about 150 to about 250 parts by weight per 100 parts by weight of component (A). On this basis, compositions containing less than 50 parts of component (C) cure into products which are less resistant to arc and tracking whereas loading of more than 300 parts of component (C) is difficult and adversely affects workability.

Component (D) is a liquid organopolysiloxane which is effective for improving the weatherability and tracking resistance of the composition. It is also essential for the composition of the invention. This liquid organopolysiloxane has an organic group attached to a silicon atom which is a monovalent hydrocarbon group exclusive of an aliphatic unsaturated hydrocarbon group. It is blocked with a $(CH_3)_3SiO_{1/2}$ unit at either end. It is generally of a linear diorganopolysiloxane structure although partial inclusion of a branched structure is acceptable. It has a viscosity of about 30 to about 100,000 centipoise at 25° C., preferably about 100 to about 100,000 centipoise at 25° C., more preferably about 1,000 to about 50,000 centipoise at 25° C.

Preferably the liquid organopolysiloxane (D) is represented by the following general formula (II).

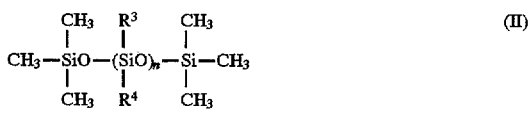

In formula (II), $R^3$ and $R^4$ are independently selected from monovalent hydrocarbon groups exclusive of aliphatic unsaturated hydrocarbon groups. $R^3$ and $R^4$ may be identical or different. Examples of the monovalent hydrocarbon group include alkyl groups having 1 to 8 carbon atoms such as methyl, ethyl, propyl, butyl and cyclohexyl, and aryl groups having 6 to 12 carbon atoms such as phenyl and tolyl, with the alkyl groups as typified by methyl being preferred. Letter n is such a number that the organopolysiloxane may have a viscosity within the above-defined range.

Component (D) is blended in an amount of about 1 to about 20 parts, preferably about 3 to about 10 parts by weight per 100 parts by weight of component (A). On this basis, compositions containing less than 1 parts of component (D) fail to provide necessary weathering and tracking resistance after curing. If the amount of component (D) exceeds 20 parts, a rubber elastomer cured is wetted on the surface with the organosiloxane to adversely affect subsequent working.

Component (E) is an organohydrogenpolysiloxane which is a crosslinking agent for the silicone rubber composition of the invention. In the presence of a platinum group catalyst (F), hydrogen atoms attached to silicon atoms (that is, SiH groups) in component (E) undergo addition reaction with aliphatic unsaturated hydrocarbon groups attached to silicon atoms in component (A) to induce crosslinking and curing. The organohydrogenpolysiloxane (E) should have at least three hydrogen atoms each attached to a silicon atom in a molecule. It is represented by the general formula:

wherein $R^5$ is an organic group and letters d and e are in the range: $0.5<d<2.5$, $0<e\leq1$, and $0.8<d+e\leq3$, preferably $0.8<d\leq2$, $0.001<e\leq0.5$, and $1.5\leq d+e\leq2.5$. The organic groups represented by $R^5$ include, like $R^2$ mentioned above, substituted or unsubstituted monovalent hydrocarbon groups having 1 to 12 carbon atoms, preferably 1 to 10 carbon atoms, exclusive of aliphatic unsaturated groups, for example, alkyl groups such as methyl, ethyl and propyl, cycloalkyl groups such as cyclohexyl, aryl groups such as phenyl and tolyl, aralkyl groups such as benzyl and phenylethyl, and substituted alkyl groups such as 3,3,3-trifluoropropyl and 3-chloropropyl. The organohydrogenpolysiloxane (E) may have a linear, branched, cyclic or network molecular structure. It preferably has a viscosity of about 1 to about 10,000 centipoise at 25° C., more preferably about 3 to about 5,000 centipoise at 25° C. Some illustrative examples are given below.

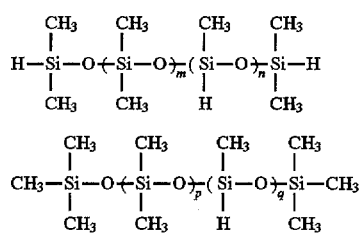

In the formulae, letters m, n and p are positive integers and q is an integer of 3 or more, and m+n and p+q are such numbers that the respective organohydrogenpolysiloxanes may have a viscosity within the above-defined range.

The organohydrogenpolysiloxane (E) is blended in a sufficient amount to provide about 0.5 to about 20 mol, preferably about 1 to about 3 mol of the hydrogen atom attached to a silicon atom (that is, SiH group) per mol of the unsaturated hydrocarbon group attached to a silicon atom in component (A). If the molar ratio of the silicon atom-attached hydrogen atom in component (E) to the silicon atom-attached unsaturated hydrocarbon group in component (A) is less than 0.5, a resulting silicone rubber composition will not fully cure. If the same ratio is above 20, a resulting silicone rubber composition can foam.

Component (F) is a platinum group catalyst for promoting curing of the silicone rubber composition. It may be selected from conventional catalysts commonly used in hydrosilylation reaction, for example, chloroplatinic acid, alcohol solutions of chloroplatinic acid, complexes of chloroplatinic acid with olefins, platinum black, and platinum on supports. Catalyst (F) is used in a catalytic amount, typically about 0.1 to about 1,000 parts, preferably about 1 to about 500 parts by weight of metallic platinum per million parts by weight of the entire composition. Less than 0.1 ppm of platinum would not fully promote curing whereas more than 1,000 ppm of platinum is uneconomical.

If desired, various additives may be added to the silicone rubber composition of the invention depending on its intended application. Exemplary additives include metal oxides such as titanium oxide, iron oxide, cerium oxide, vanadium oxide, and chromium oxide., pigments, heat resistance enhancers, flame retardants, and plasticizers.

The silicone rubber composition of the invention is obtained simply by uniformly mixing components (A) to (F) and optional components at room temperature. If desired, components (A) to (D) and optional components are mixed for about 2 to 4 hours in a planetary mixer or kneader while heating at about 100° to 200° C., and components (E) and (F) are then mixed with the mixture to complete a composition which is molded and cured. Depending on the viscosity of the mixture, any desired molding method may be selected from casting, compression molding, injection molding and transfer molding.

Curing is generally completed by heating at about 80° to about 200° C. for about 3 minutes to about 3 hours.

The silicone rubber composition thus far described is improved in electrical insulation despite the presence of a platinum group catalyst which is believed in the prior art to adversely affect the electrical insulation of silicone rubber compositions. Despite the presence of a platinum group catalyst, there is obtained a silicone rubber which has improved high-voltage electrical properties including weathering resistance, water water repellency, and tracking resistance in an application where the silicone rubber is exposed to serious air pollution and rigorous weather.

Second embodiment

The silicone rubber composition for use as a high-voltage electrical insulator according to the second embodiment is now described. The composition contains as component (1) at least one organopolysiloxane of the following average compositional formula:

$$R^6_f SiO_{(4-f)/2} \qquad (IV)$$

wherein $R^6$ is a substituted or unsubstituted monovalent hydrocarbon group and letter f is a number of 1.85 to 2.10. The organopolysiloxane is blocked with a trivinylsilyl, divinylmethylsilyl or vinyldimethylsilyl group at either end of a molecular chain thereof. An organopolysiloxane or organopolysiloxanes blocked with a trivinylsilyl or divinylmethylsilyl group at either end of a molecular chain occupy at least 70% by weight of the entirety. The organopolysiloxane has a viscosity of about 400 to 100,000 centipoise at 25° C. It is thus liquid at room temperature.

$R^6$ in formula (IV) is preferably a substituted or unsubstituted monovalent hydrocarbon group having 1 to 12 carbon atoms, more preferably 1 to 10 carbon atoms, for example, alkyl groups such as methyl, ethyl, propyl, isopropyl, butyl, hexyl, cyclohexyl, and octyl, alkenyl groups such as vinyl, allyl, propenyl, butenyl, and hexenyl, aryl groups such as phenyl and tolyl, aralkyl groups such as benzyl and phenylethyl, and substituted ones of these groups wherein some of the hydrogen atoms are replaced by halogen atoms or cyano groups such as chloromethyl, trifluoropropyl and cyanoethyl. It is preferred that at least 50 mol %, especially 60 to 99.7 mol % of the entire $R^6$ groups be methyl and 0.1 to 10 mol %, especially 0.3 to 3 mol % of the entire $R^6$ groups be vinyl.

The organopolysiloxane as the first component should contain at least 70%, preferably 80 to 100% by weight of the entirety of an organopolysiloxane blocked with a trivinylsilyl or divinylmethylsilyl group at either end of a molecular chain. If the content of the trivinylsilyl or divinylmethylsilyl-terminated organopolysiloxane is less than 70% by weight, a composition as injection molded cannot be cured within a practically acceptable short time and a cured product will have poor mechanical properties.

The organopolysiloxane of formula (IV) has a viscosity of about 400 to about 100,000 centipoise at 25° C., preferably about 1,000 to about 50,000 centipoise at 25° C. Where two or more organopolysiloxanes of formula (IV) are mixed, the mixture should have a viscosity in this range. It is understood that this organopolysiloxane is a diorganopolysiloxane having a linear structure in a substantial sense although inclusion of a trifunctional siloxane unit or monoorganosiloxane unit is acceptable.

A second component is an inorganic filler which is mainly used for enhancing the mechanical strength of the composition. Typical inorganic fillers are reinforcing fillers, for example, silica fillers such as precipitated silica, fumed silica and fired silica having a specific surface area of more than about 50 m²/g, especially about 50 to 400 m²/g as measured by a BET method. Ground quartz, diatomaceous earth, and calcium carbonate are also useful fillers though they are not so effective for reinforcing. These fillers may be used as such or they may be surface treated with organic silicon compounds such as hexamethyldisilazane and polymethylsiloxane to modify their surface to be hydrophobic prior to use.

The inorganic filler (2) is blended in an amount of about 1 to about 100 parts, preferably about 2 to about 50 parts by weight per 100 parts by weight of component (1). On this basis, less than 1 part of component (2) is less reinforcing whereas the presence of more than 100 parts of component (2) inhibits high loading of component (3) or aluminum hydroxide.

A third component is aluminum hydroxide which is effective for improving the arc resistance and tracking resistance of silicone rubber. It is essential for the composition of the invention. Aluminum hydroxide is generally represented by the formula: $Al_2O_3 \cdot 3H_2O$. Preferably aluminum hydroxide is in particulate form having a mean particle size of up to about 30 μm, often about 0.1 to about 30 μm, especially about 0.5 to about 15 μm and a BET specific surface area of about 0.1 to 20 m²/g. Aluminum hydroxide may be used as such while it may have been surface treated with suitable agents such as silane and titanate coupling agents, dimethylpolysiloxane oil, and stearic acid.

Aluminum hydroxide (3) is blended in an amount of about 50 to about 300 parts, preferably about 150 to about 250 parts by weight per 100 parts by weight of component (1). On this basis, compositions containing less than 50 parts of component (3) cure into products which are less resistant to arc and tracking whereas loading of more than 300 parts of component (3) is difficult and adversely affects workability.

A fourth component, which is optional, is an organopolysiloxane of the following average compositional formula:

$$R^7_g SiO_{(4-g)/2} \qquad (V)$$

wherein $R^7$ is a substituted or unsubstituted monovalent hydrocarbon group exclusive of an aliphatic unsaturated hydrocarbon group and letter g is a number of 1.85 to 2.2, preferably 1.9 to 2.1. The organopolysiloxane is blocked with a $(CH_3)_3SiO_{1/2}$ unit at either end of its molecular chain and has a viscosity of about 30 to 100,000 centipoise at 25° C., preferably about 100 to 100,000 centipoise at 25° C., more preferably about 1,000 to 50,000 centipoise at 25° C. It is thus liquid at room temperature. Typically it is a linear diorganopolysiloxane. By blending this liquid organopolysiloxane, the silicone rubber composition is further improved in weather resistance, water repellency and tracking resistance.

$R^7$ in formula (V) is a substituted or unsubstituted monovalent hydrocarbon group exclusive of an aliphatic unsaturated group, which is selected from those having 1 to 12 carbon atoms, more preferably 1 to 10 carbon atoms like $R^6$ in formula (IV) exclusive of alkenyl groups. Exemplary groups of $R^7$ are alkyl groups having 1 to 8 carbon atoms such as methyl, ethyl, propyl, isopropyl, butyl, hexyl, cyclohexyl, and octyl, and aryl groups having 6 to 12 carbon atoms such as phenyl and tolyl. Especially preferred are alkyl groups as typified by methyl.

The organopolysiloxane of formula (V) has a viscosity of about 30 to 100,000 centipoise at 25° C., preferably about 50 to 50,000 centipoise at 25° C.

The organopolysiloxane (4) is blended in an amount of 0 to about 20 parts, preferably about 3 to about 15 parts by weight per 100 parts by weight of component (1). If the amount of component (4) exceeds 20 parts on this basis, a rubber elastomer cured has low strength and allows the organosiloxane oil to bleed on the surface to adversely affect subsequent working.

A fifth component is an organic peroxide which serves as a curing catalyst for the silicone rubber composition of the invention. It may be selected from conventional organic peroxides commonly used in curing of silicone rubber. Several non-limiting examples of the peroxide are given below.

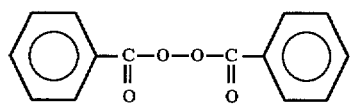

benzoyl peroxide

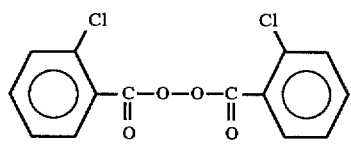

o-monochlorobenzoyl peroxide

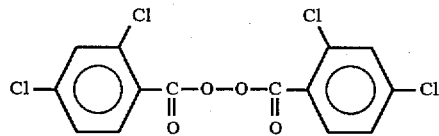

bis-2,4-dichlorobenzoyl peroxide

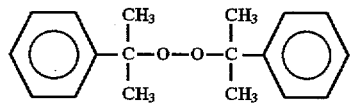

dicumyl peroxide

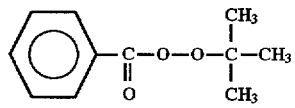

t-butyl benzoate

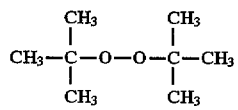

di-t-butyl peroxide

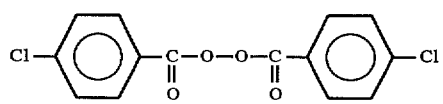

p-monochlorobenzoyl peroxide

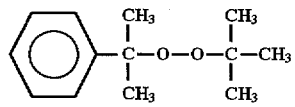

t-butylcumyl peroxide

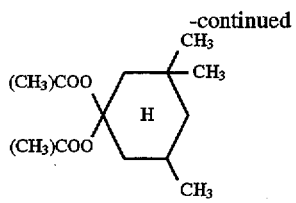

1,1-bis(t-butylperoxy)-3,3,5-trimethylcyclohexane

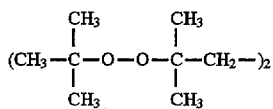

2,5-dimethyl-2,5-bis-(t-butylperoxy)hexane

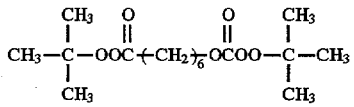

1,6-bis(t-butylperoxycarboxy)hexane

The amount of the organic peroxide blended may be properly determined in accordance with a desired curing rate. In order to achieve a practically acceptable curing rate, about 0.1 to about 10 parts, preferably about 0.2 to about 2 parts by weight of the organic peroxide is blended per 100 parts by weight of the first component.

If desired, various additives may be added to the silicone rubber composition of the invention depending on its intended application. Exemplary additives include metal oxides such as titanium oxide, iron oxide, cerium oxide, vanadium oxide, and chromium oxide, pigments, heat resistance enhancers, and flame retardants.

The silicone rubber composition of the invention is obtained simply by uniformly mixing components (1) to (5) and optional components at room temperature. If desired, components other than the organic peroxide are mixed for about 2 to 4 hours in a planetary mixer or kneader while heating at about 100° to 200° C., and the organic peroxide is then mixed with the mixture to complete a composition which is molded and cured. Since the composition is available in an injection moldable state, it may be molded by means of an injection molding machine or transfer molding machine for liquid silicone rubber and heated at about 120° to about 180° C. for a short time of about 20 to about 200 seconds. Curing is easily accomplished in this way.

The silicone rubber composition thus far described is injection moldable without extra treatment and thus easily workable, leading to an economical advantage. The composition cures into a silicone rubber which has improved high-voltage electrical properties including weathering resistance, erosion resistance, tracking resistance, and arc resistance in an application where the silicone rubber is exposed to serious air pollution, salt damage and rigorous weather. The silicone rubber is thus useful as electrical insulators, especially high-voltage insulators.

EXAMPLE

Examples of the present invention are given below by way of illustration and not by way of limitation. All parts are by weight.

Examples 1–3

(A) a dimethylpolysiloxane blocked with a dimethylvinylsiloxy group at each end and having a viscosity of 5,000 cps at 25° C., (B) finely divided silica Nipsil LP (commercially available from Nihon Silica K.K.) having a BET specific surface area of 180 m²/g, (C) aluminum hydroxide having a mean particle size of 8 µm and a BET specific surface area of 2 m²/g, (D) a dimethylpolysiloxane blocked with a trimethylsiloxy group at each end and having a viscosity of 30,000 cps at 25° C., (E) methylhydrogensiloxane of the formula shown below, (F) a 1% 2-ethylhexanol solution of chloroplatinic acid, and (G) ethynyl cyclohexanol were used in the amounts shown in Table 1. First components (A) to (D) were agitated and mixed in a planetary mixer at room temperature (25° C.), and the remaining components (E), (F) and (G) were then added to the mixture. Uniform mixing at room temperature yielded a silicone rubber composition. The composition was heated and cured at 120° C. for 10 minutes and then subjected to secondary curing at 200° C. for 4 hours, obtaining a silicone rubber sheet of 128 mm×44 mm×6 mm (thick).

Methylhydrogensiloxane (E):

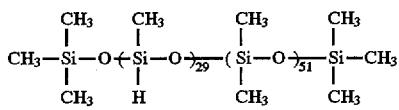

Example 4

Using the same components as in Example 1, a silicone rubber composition was prepared as in Example 1 except that components (A) to (D) were agitated and mixed at 150° C. for 2 hours. A silicone rubber sheet was similarly obtained therefrom.

Comparative Examples 1–2

Silicone rubber sheets were prepared as in Example 4 except that the components were selected as shown in Table 1.

Comparative Example 3

A silicone rubber composition was prepared as in Example 1 except that only components (A) to (C) were used. Components (A) to (C) were agitated and mixed at 150° C. for 2 hours, cooled to room temperature and then mixed with 0.6 parts of dicumyl peroxide. A silicone rubber sheet was similarly obtained therefrom.

The silicone rubber sheets thus obtained were subject to a tracking test. The results are shown in Table 1.

Tracking test

The test was according to the standard ASTM D-2303-64T. To a test assembly with an electrode-to-electrode distance of 50 mm under an applied voltage of 4 kV, a foul solution (an aqueous solution containing 0.1% $NH_4Cl$ and 0.02% nonionic surfactant) was applied dropwise from the upper electrode at a rate of 0.6 ml/min. A time taken until a leakage path was created to turn conductive and a weight loss by errosion caused thereby were measured.

TABLE 1

| | Example | | | | Comparative Example | | |
|---|---|---|---|---|---|---|---|
| | 1 | 2 | 3 | 4 | 1 | 2 | 3 |
| Composition (pbw) | | | | | | | |
| (A) dimethylpolysiloxane | 100 | 100 | 100 | 100 | 100 | 100 | 100 |
| (B) wet silica | 5 | 5 | 5 | 5 | 5 | 35 | 5 |
| (C) alumina hydrate | 200 | 100 | 200 | 200 | 100 | 10 | 200 |
| (D) dimethylpolysiloxane | 10 | 10 | 5 | 10 | — | 10 | — |
| (E) dimethylhydrogensiloxane | 6 | 6 | 6 | 6 | 6 | 6 | — |
| (F) platinum catalyst | 0.2 | 0.2 | 0.2 | 0.2 | 0.2 | 0.2 | — |
| (G) reaction controller | 0.1 | 0.1 | 0.1 | 0.1 | 0.1 | 0.1 | — |
| Organic peroxide | — | — | — | — | — | — | 0.6 |
| Tracking test | | | | | | | |
| Tracking time (hr.) | 8.0 | 4.0 | 7.5 | 8.5 | 2.5 | 1.0 | 7.0 |
| Weight loss by erosion (g) | 0.02 | 0.04 | 0.02 | 0.02 | 0.17 | 0.40 | 0.04 |

As is evident from Table 1, the silicone rubber compositions within the scope of the invention offer silicone rubbers having improved tracking resistance. Their high-voltage insulation is comparable to that of organic peroxide cured silicone rubber.

Examples 5–8

Organopolysiloxanes (1-1), (1-2), and (1-3), wet silica, alumina hydrate, and organopolysiloxane (4-1), shown below, were agitated and mixed in a planetary mixer at room temperature (25° C.), combined with dicumyl peroxide, and further mixed at room temperature until uniform, obtaining a silicone rubber composition. Using an injection molding machine for liquid silicone, this silicone rubber composition was molded and cured at 165° C. for 150 seconds and subjected to secondary curing at 200° C. for 4 hours, obtaining a silicone rubber sheet of 128 mm×44 mm×6 mm (thick).

Organopolysiloxane (1-1):

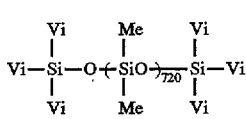

viscosity 30,000 cps

Organopolysiloxane (1-2):

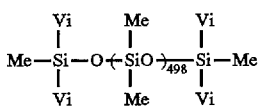

viscosity 8,000 cps

Organopolysiloxane (1-3):

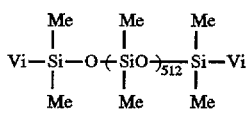

viscosity 10,000 cps (Vi: vinyl, Me: methyl)

Wet silica: Nipsil LP, commercially available from Nihon Silica K.K., a BET specific surface area of 180 m²/g Alumina hydrate: aluminum hydroxide having a mean particle size of 8 μm and a BET specific surface area of 2 m²/g.

Organopolysiloxane (4-1): dimethylpolysiloxane blocked with a trimethylsiloxy group at each end of its molecular chain, having a viscosity of 30,000 cps Example 9 and Comparative Examples 4–5

Silicone rubber compositions were prepared as in Example 5 except that organopolysiloxanes (1-1), (1-2), and (1-3), wet silica, and alumina hydrate were agitated and mixed at 150° C. for 2 hours. Silicone rubber sheets were similarly obtained therefrom.

The silicone rubber sheets thus obtained were subject to a tracking test as defined previously. The results are shown in Table 2.

(A) 100 parts by weight of an organopolysiloxane having at least two aliphatic unsaturated hydrocarbon groups in a molecule, (B) about 1 to about 100 parts by weight based on 100 parts by weight of component (A) of finely divided silica, (C) about 50 to about 300 parts by weight based on 100 parts by weight of component (A) of aluminum hydroxide having the formula $Al_2O_3 \cdot 3H_2O$ and a mean particle size of up to 10 μm, (D) about 1 to about 20 parts by weight based on 100 parts by weight of component (A) of a liquid organopolysiloxane of the following formula:

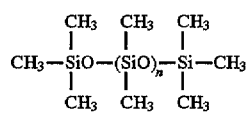

wherein letter n is a number such that the organopolysiloxane has a viscosity of about 30 to about 100,000 centipoise at 25° C., (E) an organohydrogenpolysiloxane having at least three hydrogen atoms each attached to a silicon atom in a molecule, in a sufficient amount to provide about 0.5 to about 20 mol of the silicon atom-attached hydrogen

TABLE 2

|  | Example |  |  |  |  | Comparative Example |  |
|---|---|---|---|---|---|---|---|
|  | 5 | 6 | 7 | 8 | 9 | 4 | 5 |
| Composition (pbw) | | | | | | | |
| Organopolysiloxane (1-1) | 100 | 100 | — | 100 | 100 | 40 | 100 |
| Organopolysiloxane (1-2) | — | — | 100 | — | — | — | — |
| Organopolysiloxane (1-3) | — | — | — | — | — | 60 | — |
| Wet silica | 5 | 5 | 5 | 8 | 5 | 5 | 35 |
| Alumina hydrate | 200 | 100 | 200 | 200 | 200 | 200 | 10 |
| Organopolysiloxane (4-1) | — | — | — | 10 | — | — | — |
| Dicumyl peroxide | 0.6 | 0.6 | 0.6 | 0.6 | 0.6 | 0.6 | 0.6 |
| Tracking test | | | | | | | |
| Tracking time (hr.) | 7.0 | 4.5 | 6.5 | 8.5 | 10.0 | 5.0 | 0.5 |
| Weight loss by erosion (g) | 0.02 | 0.04 | 0.02 | 0.02 | 0.02 | 0.10 | 0.4 |

As is evident from Table 2, the silicone rubber compositions within the scope of the invention are easily injection moldable and sheets cured therefrom have satisfactory tracking resistance and rubbery properties. The cured sheet of Comparative Example 4 was satisfactory in tracking resistance, but had an insufficient degree of curing under the above-mentioned injection molding conditions which were set from productivity considerations and hence, poor rubbery properties. The cured sheet of Comparative Example 5 had poor tracking resistance.

Japanese Patent Application Nos. 138184/1994 and 138185/1994 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A silicone rubber composition for use as a high-voltage electrical insulator comprising atom per mol of the unsaturated hydrocarbon group in component (A), and (F) a catalytic amount of a platinum group catalyst.

2. The composition of claim 1, wherein the organopolysiloxane (A) is of the following general formula:

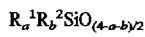

wherein $R^1$ is an aliphatic unsaturated hydrocarbon group, $R^2$ is a monovalent hydrocarbon group free of an aliphatic unsaturated bond, optionally substituted by one or more halogen atoms, and letters a and b are positive numbers satisfying the requirements $0<a\leq 1$, $0.8<b<3$ and $0.8<a+b<3$.

3. The composition of claim 1, wherein the organopolysiloxane, (A), is of the following formula:

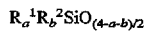

wherein $R^1$ is an monovalent aliphatic unsaturated hydrocarbon group of 2 to 8 carbon atoms, $R^2$ is a monovalent hydrocarbon group of 1 to 12 carbon atoms, optionally substituted by one or more halogen groups, and free of an aliphatic unsaturated bond, and letters a and b are positive numbers satisfying the requirements: $0.0005 \leq a \leq 0.5$, $1 \leq b < 2.5$, and $1.5 \leq a+b \leq 2.5$.

4. The composition of claim 1, wherein the finely divided silica of component (B) has a specific surface area of more than 50 m²/g.

5. The composition of claim 1, wherein the aluminum hydroxide has a mean particle size of 0.1 to 10 μm.

6. The composition of claim 1, wherein the aluminum hydroxide is surface treated with a silane or titanate coupling agent, dimethylpolysiloxane oil or stearic acid.

7. The composition of claim 1, wherein the liquid organopolysiloxane, (D), has a viscosity of 100 to 100,000 centipoise at 25° C.

8. The composition of claim 1, wherein the organohydrogenpolysiloxane (E) is of the following formula:

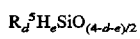

wherein $R^5$ is a monovalent hydrocarbon group, optionally substituted by halogen atoms, and letters d and e are in the range: $0.5 < d < 2.5$, $0 < e \leq 1$ and $0.8 < d+e \leq 3$.

9. The composition of claim 1, wherein the organohydrogenpolysiloxane, (E), is of the following formula:

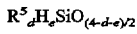

wherein $R^5$ is an monovalent hydrocarbon group of 1 to 12 carbon atoms, excluding aliphatic unsaturated groups, and letters d and e are positive numbers satisfying the requirements: $0.8 < d \leq 2$, $0.001 < e \leq 0.5$, and $1.5 \leq d+e \leq 2.5$.

10. The composition of claim 1, comprising 2–50 parts by weight of (B), 150–250 parts by weight of (C) and 3–10 parts by weight of (D) based on 100 parts by weight of (A); and a sufficient amount of (E) to provide 1 to 3 mols of SiH atoms per mol of unsaturated hydrocarbon groups in (A).

11. A liquid silicone rubber composition for use as a high-voltage electrical insulator and for injection molding comprising (1) 100 parts by weight of at least one organopolysiloxane of the following average compositional formula:

wherein $R^6$ is a halo- or cyano- substituted or unsubstituted monovalent hydrocarbon group and letter f is a number of 1.85 to 2.10, said organopolysiloxane being blocked with a trivinylsilyl, divinylmethylsilyl or vinyldimethylsilyl group at either end of the molecular chain thereof, 80–100% by weight of the organopolysiloxane being blocked with a trivinylsilyl or divinylmethylsilyl group at either end of a molecular chain, said organopolysiloxane having a viscosity of about 400 to 100,000 centipoise at 25° C., (2) about 1 about 100 parts by weight based on 100 parts by weight of component (1) of an inorganic filler, (3) about 50 to 300 parts by weight based on 100 parts by weight of component (1), of aluminum hydroxide having the formula $Al_2O_3 \cdot 3H_2O$ and a mean particle size of up to 30 μm, (4) 0 to about 20 parts by weight based on 100 parts by weight of component (1), of an organopolysiloxane of the following average compositional formula:

wherein $R^7$ is an unsubstituted monovalent hydrocarbon group exclusive of an aliphatic unsaturated hydrocarbon group and letter g is a number of 1.85 to 2.2, blocked with a $(CH_3)_3SiO_{1/2}$ unit at either end of its molecular chain, and having a viscosity of about 30 to 100,000 centipoise at 25° C., and (5) about 0.1 to about 10 parts by weight based on 100 parts by weight of component (1), of an organic peroxide.

12. The composition of claim 11, wherein $R^6$ is a halogen- or cyano-substituted or unsubstituted hydrocarbon group of 1 to 12 carbon atoms.

13. The composition of claim 11, wherein at least 50 mol % of the $R^6$ groups are methyl and 0.1 to 10 mol % of the $R^6$ groups are vinyl.

14. The composition of claim 11, wherein the inorganic filler (2) is a silica filler having a specific surface area of more than about 50 m²/g.

15. The composition of claim 11, wherein the aluminum hydroxide has a mean particle size of 0.1 to 30 μm.

16. The composition of claim 11, wherein the aluminum hydroxide is surface treated with a silane or titanate coupling agent, dimethylpolysiloxane oil or stearic acid.

17. The composition of claim 11, wherein the organopolysiloxane (4) is blended in an amount of about 3 to about 15 parts by weight per 100 parts by weight of component (1).

18. The composition of claim 17, wherein $R^7$ has 1–12 carbon atoms.

19. The silicone rubber composition of claim 11 wherein $R^7$ is an alkyl group of 1 to 8 carbon atoms.

* * * * *